(12) United States Patent
Luis y Prado et al.

(10) Patent No.: US 10,086,772 B2
(45) Date of Patent: Oct. 2, 2018

(54) SUPPORTING A PORTABLE ELECTRONIC DEVICE

(71) Applicant: Workshops for Warriors, San Diego, CA (US)

(72) Inventors: Hernán Luis y Prado, San Diego, CA (US); Javier Evans, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 260 days.

(21) Appl. No.: 15/008,195

(22) Filed: Jan. 27, 2016

(65) Prior Publication Data

US 2017/0210303 A1     Jul. 27, 2017

(51) Int. Cl.
*H04N 5/64*     (2006.01)
*B60R 11/04*     (2006.01)
*B60R 13/10*     (2006.01)
*H04N 7/18*     (2006.01)
*G06K 9/00*     (2006.01)
*B60R 11/00*     (2006.01)

(52) U.S. Cl.
CPC ............ *B60R 11/04* (2013.01); *B60R 13/105* (2013.01); *G06K 9/00791* (2013.01); *H04N 7/183* (2013.01); *B60R 2011/004* (2013.01); *B60R 2011/0052* (2013.01); *B60R 2011/0066* (2013.01)

(58) Field of Classification Search
CPC ............ B60R 11/04; B60R 2011/0052; B60R 2011/0066; B60R 2011/004; B60R 13/105; H04N 7/183; G06K 9/00791
USPC .......................................................... 348/837
See application file for complete search history.

(56) References Cited

U.S. PATENT DOCUMENTS

| | | | | |
|---|---|---|---|---|
| 2005/0093684 A1* | 5/2005 | Cunnien | ............. | B60Q 1/0023 340/435 |
| 2007/0289176 A1* | 12/2007 | Anderson | ............... | B60R 13/00 40/209 |
| 2010/0294901 A1* | 11/2010 | Kreft | ..................... | B60R 13/105 248/205.3 |

* cited by examiner

*Primary Examiner* — Allen Wong
(74) *Attorney, Agent, or Firm* — Fish & Richardson P.C.

(57) ABSTRACT

A portable electronic device mount apparatus includes a frame that includes a channel sized to receive a vehicle identifier, the frame further including at least one aperture to receive a fastener to secure the frame to a vehicle; and at least one tab that extends from an edge of the frame, the tab including a planar surface sized to receive an image capture device secured to the frame.

17 Claims, 8 Drawing Sheets

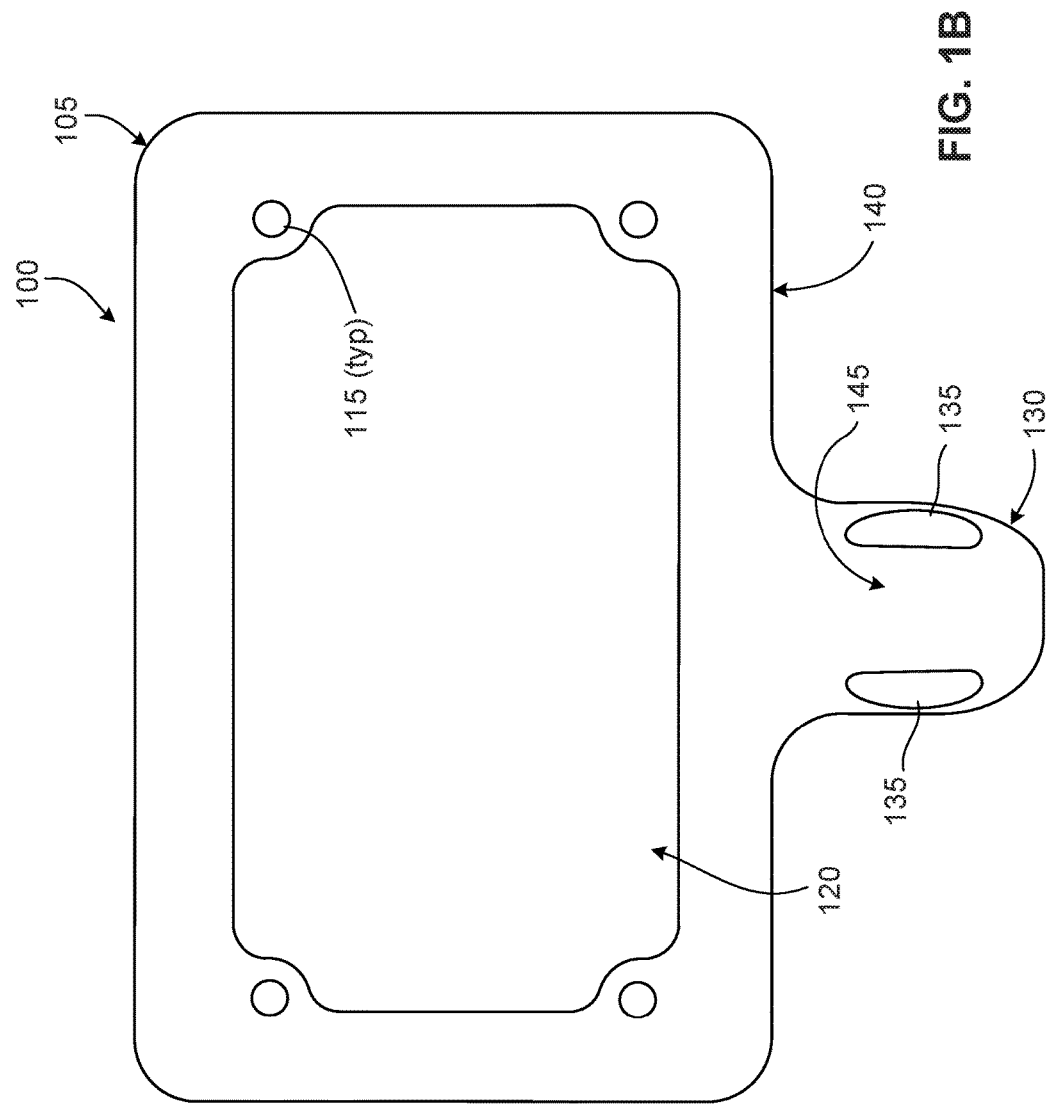

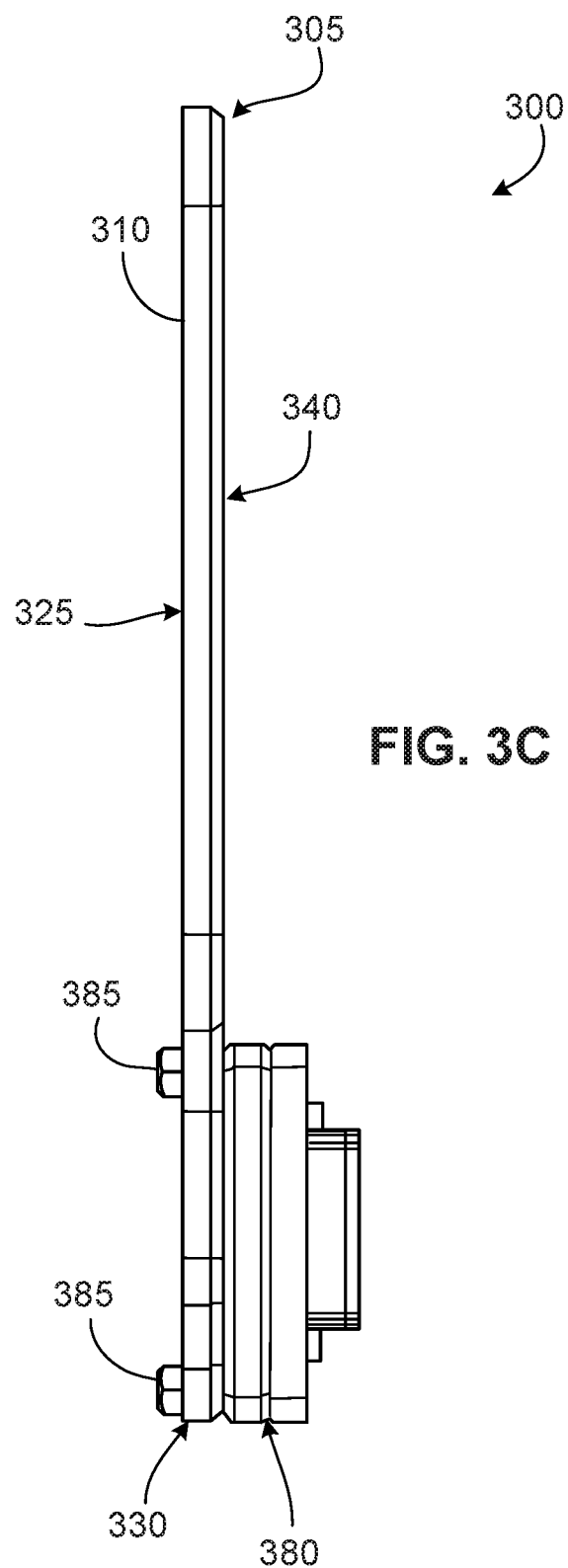

SUPPORTING A PORTABLE ELECTRONIC DEVICE

TECHNICAL FIELD

This document relates to apparatus, systems, and methods for supporting a device. This device may be an image (sound, or combination thereof) capture device such as, for example, a portable camera, a microphone, electronic sensor, global positioning device, microwave telecommunication unit, laser rangefinder, a telemetry unit, or other portable electronic device.

BACKGROUND

Cameras (e.g., still and video) may be used to capture sound and images during a particular event. In some cases, cameras can be hand-held, shoulder mounted, floor or surface mounted or otherwise, as needed for stability. A stable image capture device, in some instances, may provide for a clearer or more accurate image capture of the event.

SUMMARY

A general implementation of a portable electronic device mount apparatus includes a frame that includes a channel sized to receive a vehicle identifier, the frame further including at least one aperture to receive a fastener to secure the frame to a vehicle; and at least one tab that extends from an edge of the frame, the tab including a planar surface sized to receive an image capture device secured to the frame.

In a first aspect combinable with the general implementation, the tab includes a slot defined between ridges that protrude from the planar surface, the slot sized and positioned to receive a portion of the image capture device secured to the frame.

In a further aspect combinable with any of the previous aspects, the planar surface of the tab is located on a first side of the frame, and the channel is located on a second side of the frame opposite the first side.

In a further aspect combinable with any of the previous aspects, a depth of the channel is sized based at least in part on a dimension of the vehicle identifier.

In a further aspect combinable with any of the previous aspects, the depth of the channel is selected such that the vehicle identifier is substantially flush with a top edge of the frame when secured to the frame.

In a further aspect combinable with any of the previous aspects, herein the at least one aperture is positioned in the frame such that the fastener that secures the frame to the vehicle secures the vehicle identifier to the frame.

In a further aspect combinable with any of the previous aspects, the vehicle identifier includes a license plate.

In a further aspect combinable with any of the previous aspects, the vehicle includes a motor vehicle, a non-motorized vehicle, a marine vehicle, or a space vehicle.

In a further aspect combinable with any of the previous aspects, the at least one aperture includes four apertures.

In a further aspect combinable with any of the previous aspects, the tab includes at least one tab aperture to receive a tab fastener to secure the image capture device to the frame.

In a further aspect combinable with any of the previous aspects, the at least one tab aperture includes at least one aperture positioned through the tab to receive tab fasteners to secure an image capture device coupling to the frame.

In a further aspect combinable with any of the previous aspects, the tab perpendicularly extends from the frame relative to a plane that includes the frame.

In another general implementation, a method for capturing images includes positioning a vehicle identifier in a channel of a frame of a portable electronic device mount; securing an image capture device to a planar surface of a tab that extends from an edge of the frame; and securing the vehicle identifier to the frame and the portable electronic device mount to a vehicle with at least one fastener inserted through an aperture formed in the frame.

In a first aspect combinable with the general implementation, securing an image capture device to a planar surface of a tab that extends from an edge of the frame includes sliding a portion of the image capture device through a slot defined between ridges that protrude from the planar surface.

In a further aspect combinable with any of the previous aspects, the planar surface of the tab is located on a first side of the frame, and the channel is located on a second side of the frame opposite the first side.

In a further aspect combinable with any of the previous aspects, a depth of the channel is sized based at least in part on a dimension of the vehicle identifier.

In a further aspect combinable with any of the previous aspects, positioning a vehicle identifier in a channel of a frame includes positioning the vehicle identifier to the depth of the channel such that the vehicle identifier is substantially flush with a top edge of the frame when secured to the frame.

In a further aspect combinable with any of the previous aspects, the vehicle identifier includes a license plate.

In a further aspect combinable with any of the previous aspects, the vehicle includes a motor vehicle, a non-motorized vehicle, a marine vehicle, or a space vehicle.

In a further aspect combinable with any of the previous aspects, securing the vehicle identifier to the frame and the portable electronic device mount to a vehicle with at least one fastener inserted through an aperture formed in the frame includes securing the vehicle identifier to the frame and the portable electronic device mount to the vehicle with four fasteners inserted through corresponding four apertures formed in the frame.

In a further aspect combinable with any of the previous aspects, securing an image capture device to a planar surface of a tab includes securing the image capture device to the planar surface of the tab with at least one tab fastener inserted through a tab aperture formed in the tab.

Various implementations of apparatus, systems, and method for mounting an image capture device according to the present disclosure may include one, some, or all of the following features. For example, an image capture device, such as a video or still camera, may be securely mounted to a vehicle to operate (e.g., capture images) during operation of the vehicle. The image capture device may be operated independently of the vehicle and without human intervention of the vehicle operator. The image capture device may be quickly attached and removed from this mounting plate by using a quick release mount (inherent to the device manufacturer or of another device) or be permanently or semi-permanently affixed (via mechanical or chemical bonding) to the mounting plate. The mounting plate allows the device to be positioned in various positions/angles quickly and securely. The present disclosure allows an image capture device to be used on several vehicles/mounting positions by virtue of a common baseplate or "tab."

The details of one or more embodiments are set forth in the accompanying drawings and the description below.

Other features, objects, and advantages will be apparent from the description and drawings, and from the claims.

DESCRIPTION OF DRAWINGS

FIGS. 1A-1B illustrate an example implementation of a portable electronic device mount.

FIGS. 3A-3C illustrate another example implementation of a portable electronic device mount.

DETAILED DESCRIPTION

Figure 1A:
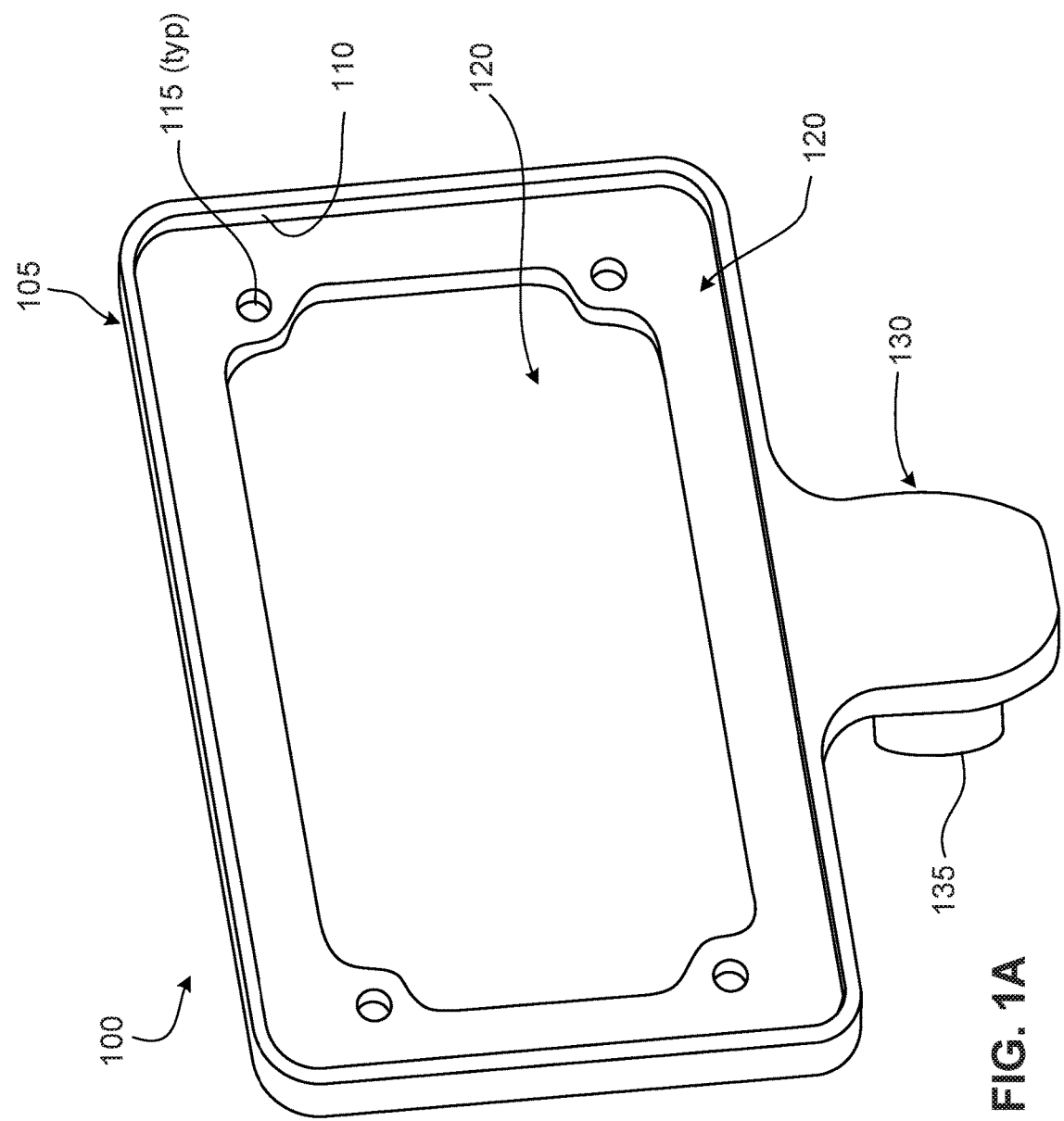

FIGS. 1A-1B illustrate an example implementation of a portable electronic device mount 100. The portable electronic device mount 100, as explained more fully herein, may accept an image capture device (e.g., camera, video camera, infrared or light sensitive camera, laser device, infrared signaling unit, GPS antenna, radar antenna, infrared "cat eyes" or other electronic and even non-electronic device) into a portion of the mount 100 and secure the device (not shown here) to the mount 100. In some aspects, the image capture device may include a GoPro® camera. The mount 100 may further be secured to, for example, a vehicle or other mobile transportation device. Such examples include cars, trucks, motorcycles, bicycles, remote controlled devices (e.g., drones, planes, cars), boats and other marine vehicles, as well as space and lunar vehicles. While the vehicle is in operation (e.g., moving), the image capture device secured to the mount 100 may record images (e.g., still or moving) and/or sound, thereby allowing a vehicle operator to safely operate the vehicle independent of operation of the image capture device.

The illustrated implementation of the portable electronic device mount 100 includes a frame 105 that defines an opening 120 and, in this example, is generally rectangular, but may also be generally square or another shape (e.g., round or conforming to a contour of a vehicle, ship, vessel, counter, dashboard, surface, or other profile which may serve as a base). The frame 105, on a rear face 125 shown in FIG. 1A, includes a channel 110 formed as a recessed area in the frame 105. In some examples, a depth of the channel 110 may be selected based at least in part on a thickness of a vehicle identifier (e.g., license plate or otherwise) that may be secured to the frame 105. Channel 110 may also be used to insert a plate of Plexiglas®, acrylic or other clear material on top of the vehicle identification plate to shield the vehicle identification plate from stones, debris, dirt, radar reflections, glare, or otherwise.

Formed in the channel 110 are one or more apertures 115 (four shown here). In some aspects, fasteners (not shown) may be received through the apertures 115 to, for example, secure the portable electronic device mount 100 to a vehicle or a portion of a vehicle. Further, the apertures 115 may receive one or more fasteners to secure the vehicle identifier to the frame 105. In some examples, fasteners used to secure the portable electronic device mount 100 to a vehicle may also secure the vehicle identifier to the frame 105. The device and apertures 115 may also be shaped in such a way as to allow the apertures 115 to be used to fasten the device mount to a hydraulic brake reservoir holder on a motorcycle, the pelorus on a vessel, or on the landing gear assembly on an aircraft. For example, a 3D printed model could be manufactured to snap on to a parachute jumper's helmet with a small tab to attach the device.

The illustrated portable electronic device mount 100 includes a tab 130 that extends from a side of the frame 105. Although the tab 130 is illustrated as extending from a long side of the generally rectangular frame 105, other example implementations may include the tab 130 extending from a short side of the generally rectangular frame 105. Further, there may be multiple tabs 130 that extend from the frame 105.

The illustrated tab 130 is integrally formed with the frame 105 and, in some implementations, may be forged, extruded, or machined from the same stock as the frame 105 (e.g., aluminum, steel, plastic, wood, polyethylene, or other rigid material). In alternative aspects, the tab 130 may be coupled to the frame 105 so as to rotate, pivot, or otherwise move relative to the frame 105, while still remaining coupled to the frame 105. For instance, the tab 130 may be hingedly coupled to the frame 105.

As illustrated in FIG. 1B, which shows a front side 140 of the portable electronic device mount 100, the tab 130 includes a slot 145 defined between two ridges 135. In some aspects, such as when a particular type of image capture device is secured to the portable electronic device mount 100, the slot 145 may accept a portion of the image capture device, which slides into the slot 145 and is secured with the ridges 135. For example, in the case of a GoPro® image capture device, the slot 145 may accept a frame, housing, or other portion of the image capture device and secure the image capture device to the frame 105.

Figure 2:
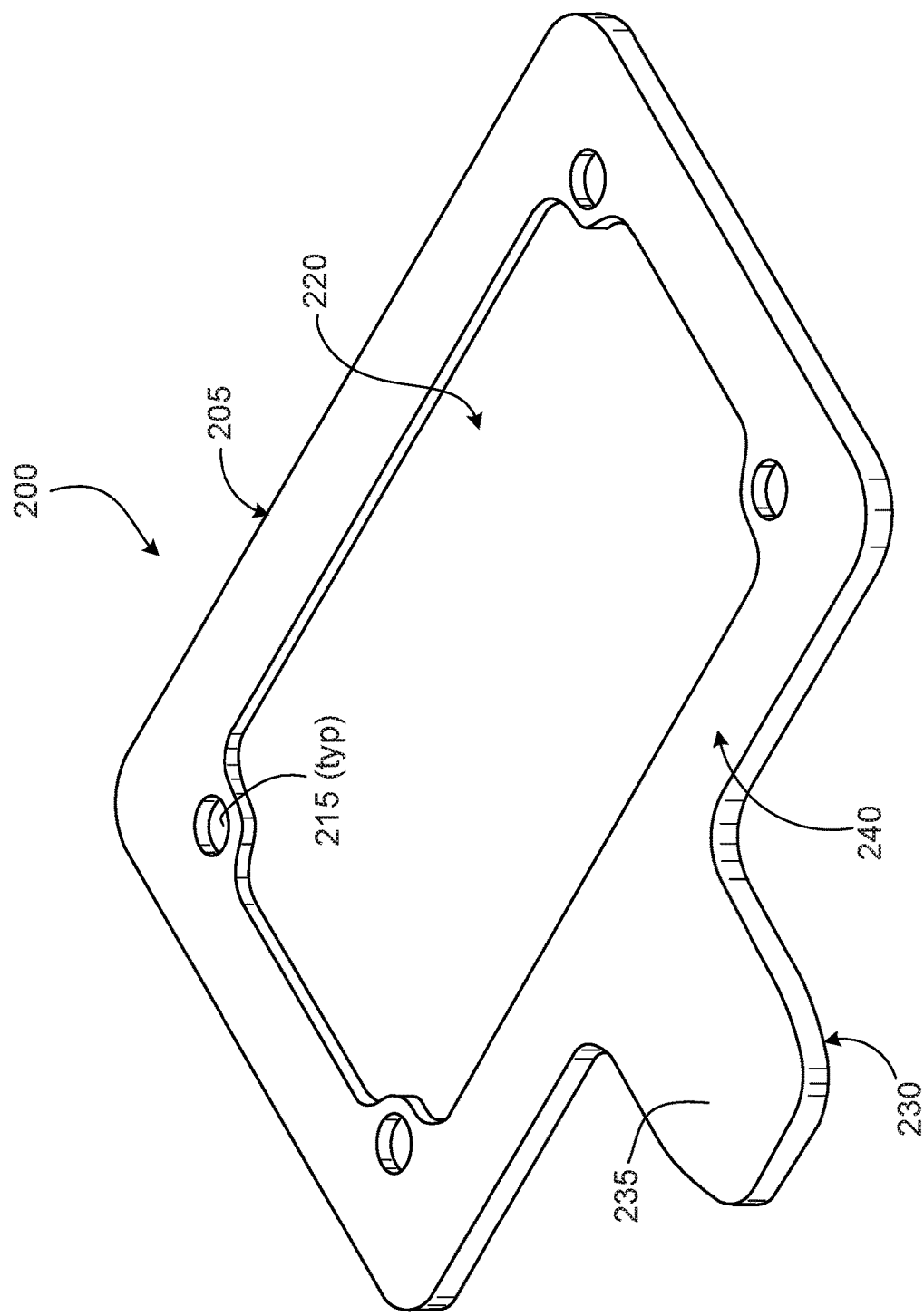
FIG. 2 illustrates another example implementation of a portable electronic device mount.

FIG. 2 illustrates another example implementation of a portable electronic device mount 200. Portable electronic device mount 200 may be substantially similar to the portable electronic device mount 100, and as shown in FIG. 2, a frame 205 defines an opening 220 and includes one or more apertures 215. In this figure, a front side 240 of the frame 205 is illustrated.

The portable electronic device mount 200 also includes a tab 230 that extends from the frame 205. In this example, a front side of the tab 230, as shown in FIG. 2, includes a substantially (e.g., accounting for material inconsistencies) planar surface 235. In this implementation of the portable electronic device mount 200, the planar surface 235 may accept (e.g., by an adhesive, mechanical fasteners, or otherwise) an external mount for an image capture device.

In some aspects, the tab 230 may be implemented to mount a variety of other mounts that are commonly available for various devices (e.g., imagine capture devices or otherwise) without having to modify or damage a vehicle or the supporting mount to attach the device. For example, a hole may be formed (e.g., drilled) through the tab 235 of the mount 200 and either attach the device itself, or a quick release mount made specifically for the device, to the tab 235. Further, the mount 200 may include an incorporated quick release mount configuration.

Figure 3A:
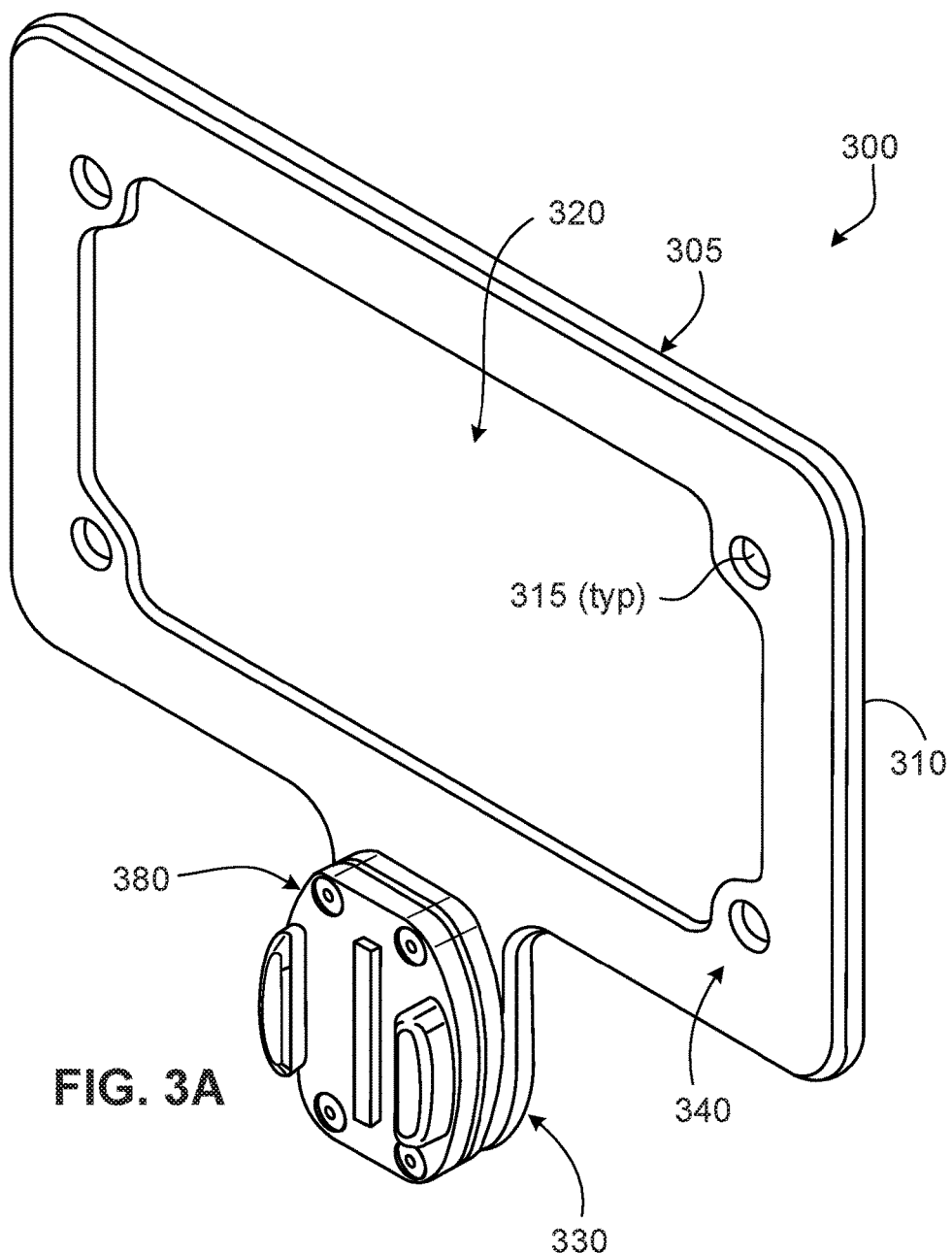
Figure 3B:
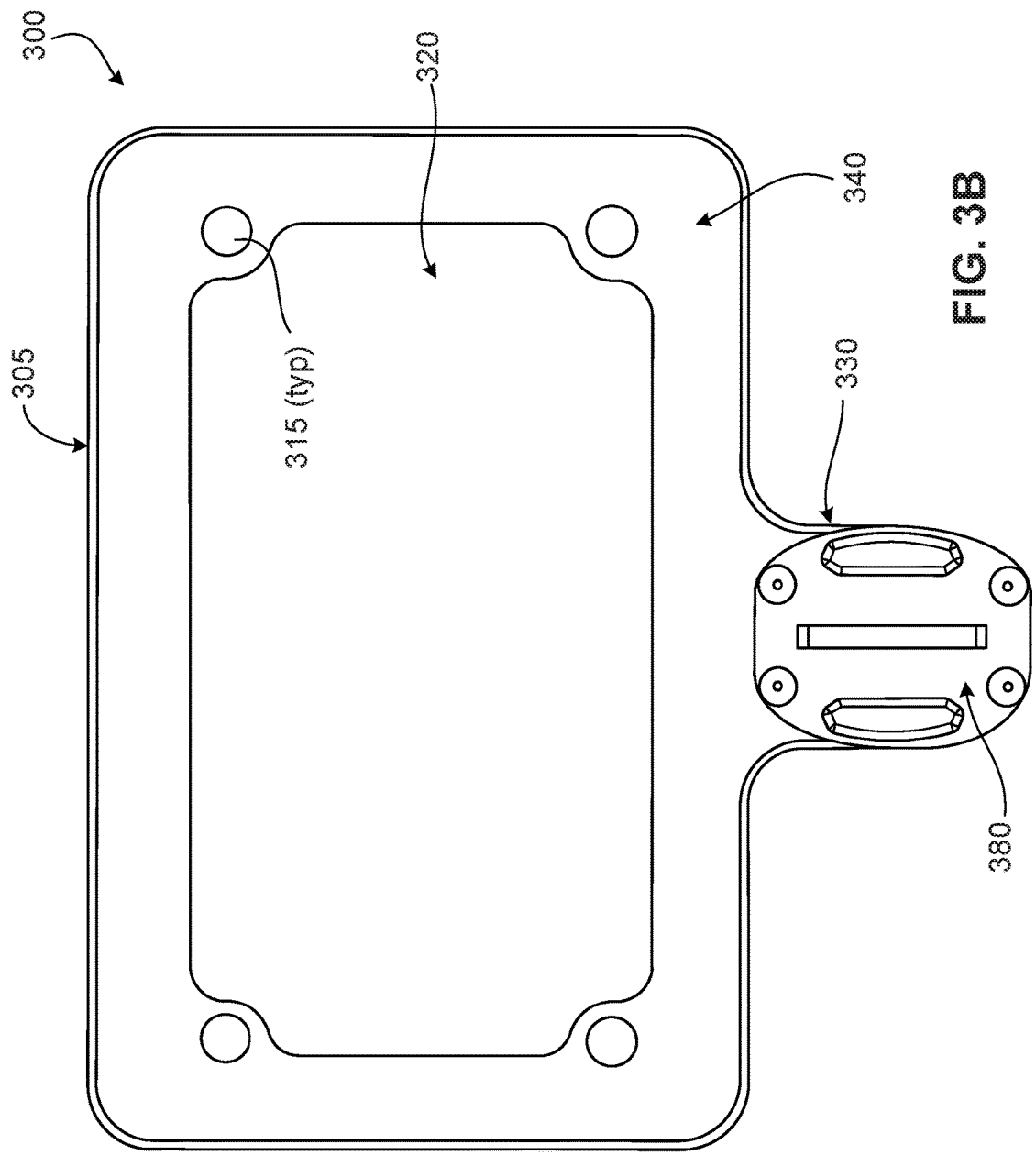

FIGS. 3A-3C illustrate another example implementation of a portable electronic device mount 300. FIG. 3A shows an isometric view, FIG. 3B shows a front plan view, and FIG. 3C shows a side view. The portable electronic device mount 300, as with the portable electronic device mount 100 and 200, may accept an image capture device (e.g., camera, video camera, infrared or light sensitive camera, or otherwise) into a portion of the mount 300 and secure the device (not shown here) to the mount 300. In some aspects, the image capture device may include a GoPro® camera. The mount 300 may further be secured to, for example, a vehicle or other mobile transportation device. Such examples include cars, trucks, motorcycles, bicycles, remote controlled devices (e.g., drones, planes, cars), boats and other marine vehicles, as well as space and lunar vehicles. While the vehicle is in operation (e.g., moving), the image capture device secured to the mount 300 may record images (e.g., still or moving), thereby allowing a vehicle operator to safely operate the vehicle independent of operation of the image capture device. The mount 300 may also allow a remote operator to control and/or operate the image capture device independently of the vehicle operator.

The illustrated implementation of the portable electronic device mount 300 includes a frame 305 that defines an opening 320 and, in this example, is generally rectangular, but may also be generally square or another shape (e.g., round). The frame 305, on a rear face 325 shown in FIG. 3A, includes a channel 310 formed as a recessed area in the frame 305. In some examples, a depth of the channel 310 may be selected based at least in part on a thickness of a vehicle identifier (e.g., license plate or otherwise) that may be secured to the frame 305.

Formed in the channel 310 are one or more apertures 315 (four shown here). In some aspects, fasteners (not shown) may be received through the apertures 315 to, for example, secure the portable electronic device mount 300 to a vehicle or a portion of a vehicle (or to another attachment point). Further, the apertures 315 may receive one or more fasteners to secure the vehicle identifier to the frame 305. In some examples, fasteners used to secure the portable electronic device mount 300 to a vehicle may also secure the vehicle identifier to the frame 305. In alternative aspects, the apertures 315 may also be reconfigured as hooks, or as molded tabs that could snap or click into a given profile of a vehicle or a portion of a vehicle without the need for fasteners.

The illustrated portable electronic device mount 300 includes a tab 330 that extends from a side of the frame 305. Although the tab 330 is illustrated as extending from a long side of the generally rectangular frame 305, other example implementations may include the tab 330 extending from a short side of the generally rectangular frame 305. Further, there may be multiple tabs 330 that extend from the frame 305 to accommodate several different mounting positions or to allow for the mounting of different devices either simultaneously or independently.

The illustrated tab 330 is integrally formed with the frame 305 and, in some implementations, may be forged, extruded, or machined from the same stock as the frame 305 (e.g., aluminum, steel, polyethylene, or other rigid material). In alternative aspects, the tab 330 may be coupled to the frame 305 so as to rotate, pivot, or otherwise move relative to the frame 304, while still remaining coupled to the frame 305. For instance, the tab 330 may be hingedly coupled to the frame 305.

As illustrated in FIG. 3B, which shows a front side 340 of the portable electronic device mount 300, the tab 330 may include a planar front surface, similar to the planar surface 235 of the portable electronic device mount 200. Thus, as shown in FIGS. 3A-3C, an image capture device coupling 380 may be secured (e.g., with fasteners 385 shown in FIG. 3C) to the tab 330. Tab 330 may also be formed at a different angle or rotated so as not to be parallel to the surface of the front side 340. For example, the tab 330 may be turned 90 degrees so that the device is capturing the right or left of the vehicle, and not the front or back.

Figure 4:
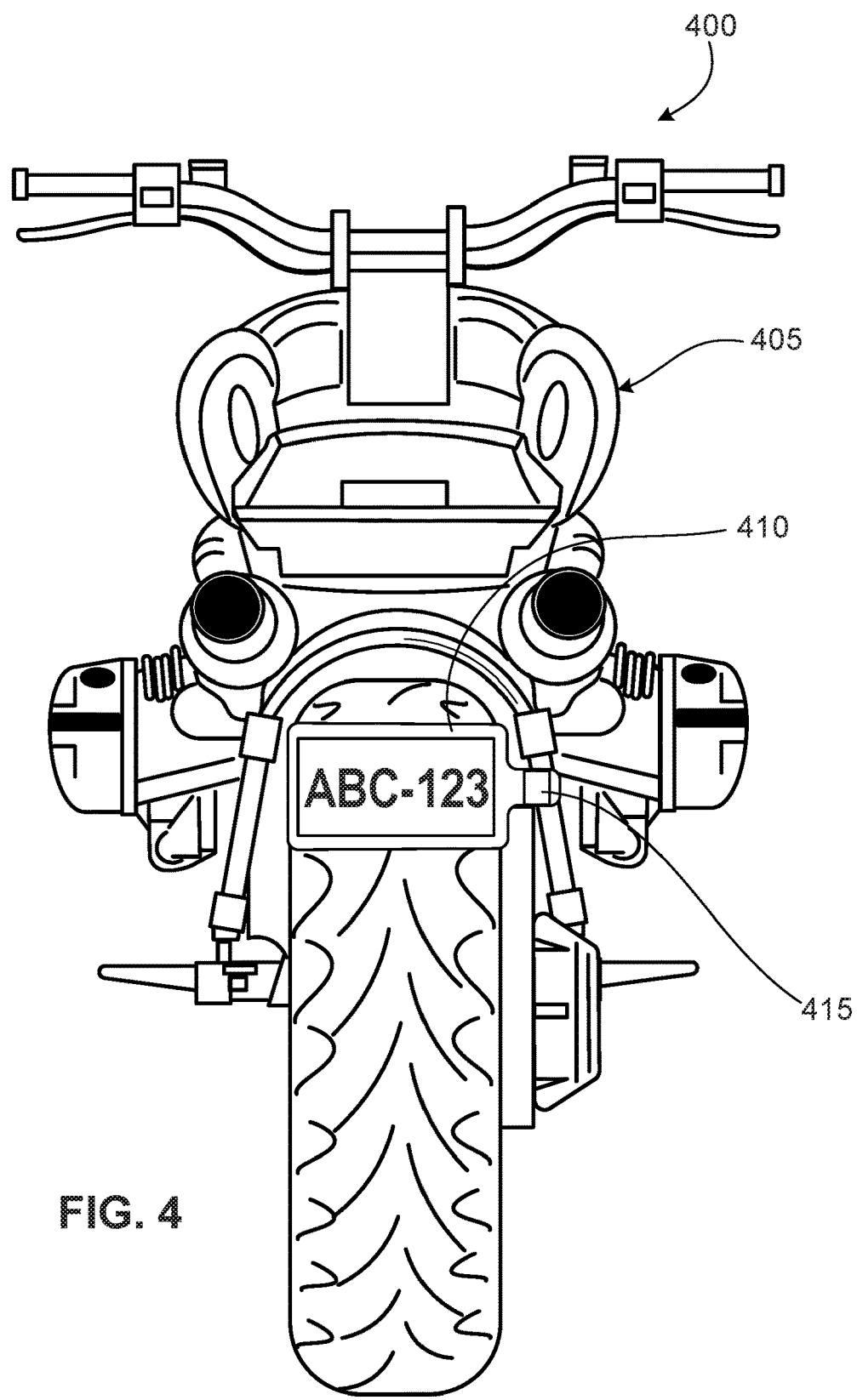
FIG. 4 illustrates an example implementation of a portable electronic device mount coupled to a first vehicle.

FIG. 4 illustrates an example implementation of a portable electronic device mount 410 coupled to a first vehicle 400. In this example, the vehicle 400 includes a motorcycle 405. The portable electronic device mount 410 is mounted to the motorcycle 405 near a back wheel and supports a license plate of the motorcycle 405. As shown in this example, the portable electronic device mount 410 includes an image capture device 415 (e.g., a GoPro® camera) mounted to the portable electronic device mount 410. The portable electronic device mount 410 may also be coupled to the motorcycle 405 at other locations, such as on the side of a motorcycle with mount 410 rotated 90 degrees so that tab 515 is either at the top or bottom of the mount 410.

Figure 5:
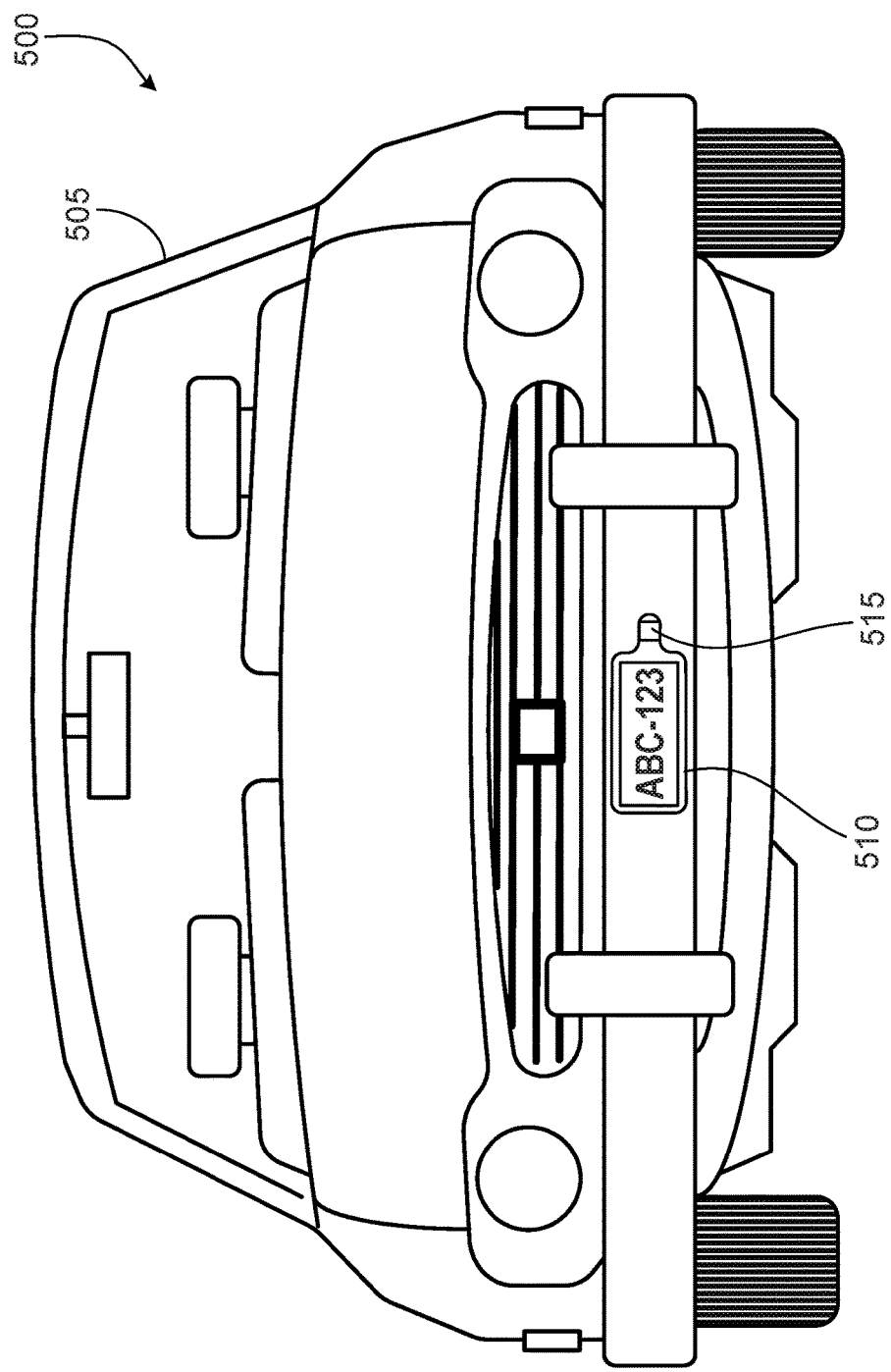
FIG. 5 illustrates an example implementation of a portable electronic device mount coupled to a second vehicle.

FIG. 5 illustrates an example implementation of a portable electronic device mount 510 coupled to a second vehicle 500. In this example, the vehicle 500 includes a car 505. The portable electronic device mount 510 is mounted to the car 505 near a back bumper and supports a license plate of the car 505. As shown in this example, the portable electronic device mount 510 includes an image capture device 515 (e.g., a GoPro® camera) mounted to the portable electronic device mount 510. The portable electronic device mount 510 may also be coupled to the car 505 at the front bumper or other locations.

A number of embodiments have been described. Nevertheless, it will be understood that various modifications may be made without departing from the spirit and scope of what is described. Accordingly, other embodiments are within the scope of the following claims.

What is claimed is:

1. A portable electronic device mount apparatus, comprising:
   a frame that comprises a channel sized to receive a vehicle identifier, the frame further comprising at least one aperture to receive a fastener to secure the frame to a vehicle; and
   at least one tab that is integrally formed with, and extends from an edge of, the frame, the tab comprising a planar surface sized to receive an image capture device secured to the frame, the tab comprising a slot defined between ridges that protrude from the planar surface, the slot sized and positioned to receive a portion of the image capture device secured to the frame, the planar surface of the tab located on a first side of the frame, and the channel located on a second side of the frame opposite the first side.

2. The apparatus of claim 1, wherein a depth of the channel is sized based at least in part on a dimension of the vehicle identifier.

3. The apparatus of claim 2, wherein the depth of the channel is selected such that the vehicle identifier is substantially flush with a top edge of the frame when secured to the frame.

4. The apparatus of claim 1, wherein the at least one aperture is positioned in the frame such that the fastener that secures the frame to the vehicle secures the vehicle identifier to the frame.

5. The apparatus of claim 1, wherein the vehicle identifier comprises a license plate.

6. The apparatus of claim 1, wherein the vehicle comprises a motor vehicle, a non-motorized vehicle, a marine vehicle, or a space vehicle.

7. The apparatus of claim 1, wherein the at least one aperture comprises four apertures.

8. The apparatus of claim 1, wherein the tab comprises at least one tab aperture to receive a tab fastener to secure the image capture device to the frame.

9. The apparatus of claim 8, wherein the at least one tab aperture comprises at least one aperture positioned through the tab to receive tab fasteners to secure an image capture device coupling to the frame.

10. The apparatus of claim 1, wherein the tab perpendicularly extends from the frame relative to a plane that includes the frame.

11. A method for capturing images, comprising:
positioning a vehicle identifier in a channel of a frame of a portable electronic device mount;
securing an image capture device to a planar surface of a tab that is integrally formed with, and extends from an edge of, the frame by sliding a portion of the image capture device through a slot defined between ridges that protrude from the planar surface, the planar surface of the tab is located on a first side of the frame, and the channel is located on a second side of the frame opposite the first side; and
securing the vehicle identifier to the frame and the portable electronic device mount to a vehicle with at least one fastener inserted through an aperture formed in the frame.

12. The method of claim 11, wherein a depth of the channel is sized based at least in part on a dimension of the vehicle identifier.

13. The method of claim 12, wherein positioning a vehicle identifier in a channel of a frame comprises positioning the vehicle identifier to the depth of the channel such that the vehicle identifier is substantially flush with a top edge of the frame when secured to the frame.

14. The method of claim 11, wherein the vehicle identifier comprises a license plate.

15. The method of claim 11, wherein the vehicle comprises a motor vehicle, a non-motorized vehicle, a marine vehicle, or a space vehicle.

16. The method of claim 11, wherein securing the vehicle identifier to the frame and the portable electronic device mount to a vehicle with at least one fastener inserted through an aperture formed in the frame comprises securing the vehicle identifier to the frame and the portable electronic device mount to the vehicle with four fasteners inserted through corresponding four apertures formed in the frame.

17. The method of claim 11, wherein securing an image capture device to a planar surface of a tab comprises securing the image capture device to the planar surface of the tab with at least one tab fastener inserted through a tab aperture formed in the tab.

* * * * *